Aug. 4, 1942.    G. W. NEELY    2,291,745
ELECTRODE FOR SEA WATER DETECTION
Filed March 5, 1941

INVENTOR.
GLEN W. NEELY.
BY Allen & Allen
ATTORNEYS.

Patented Aug. 4, 1942

2,291,745

UNITED STATES PATENT OFFICE 2,291,745

ELECTRODE FOR SEA WATER DETECTION

Glen W. Neely, River Forest, Ill., assignor to The Richardson Company, Lockland, Ohio, a corporation of Ohio Application March 5, 1941, Serial No. 381,864

8 Claims. (Cl. 136—120)

My invention relates to structures used for detection of the depth of sea water particularly in closed compartments of ships by means of electric currents set up through the sea water as an electrolyte.

It has been suggested to use as one electrode a silver or cadmium electrode located near the bottom of a compartment subject to possible infiltration of sea water, and a series of electrodes of another metal such as silver if the lower electrode is cadmium, or vice versa. By connecting up the bottom electrode as one side of a circuit, and the other electrodes at various levels as the other side of a series of circuits, it will be possible to register on suitable instruments the current generated, and thus detect the presence of the sea water and the depth thereof.

For this purpose at least one of the electrodes for each circuit must be protected so that it will not be connected by a film of sea water or other fluid with the shell of the vessel, and to accomplish this the lower electrode has been arranged to be located on the end of a rod of dielectric material projecting within a sleeve closed at the top. Water cannot rise in such an electrode so as to fill the sleeve because of the air entrapped in the top of the sleeve. Hence the electrode on the end of the rod will not be "shorted" and will not result in giving an indication on the indicating or measuring instruments employed, when sea water is not actually present in sufficient depth to give a regular indication.

I have found that this structure alone is not enough. In many tanks and enclosed chambers in vessels, oil is present on the surface of water therein in sufficient quantity to build up a film on an electrode surface which is contacted thereby. Thus in "blister" tanks in war ships there is usually a heavy film of oil. This, it has been found, will coat the surface of an exposed electrode and insulate it effectively enough so that its functioning cannot be relied upon.

It is the object of my invention to provide an electrode for use in such systems as have now been briefly identified, which will not become subjected to insulation by films of oil.

I have found that if there are sharp points and edges developed on the electrode surfaces, particularly where these are so oriented as to cut into the surface of oil and a rising body of sea water, the oil film will be sufficiently dispersed so that as the water rises no scum of oil will coat the electrode sufficiently to insulate it, after the electrode is submerged.

The application of my invention to the bottom electrode is its most important application, and in the specification that follows I will confine my description thereto.

Figure 1:
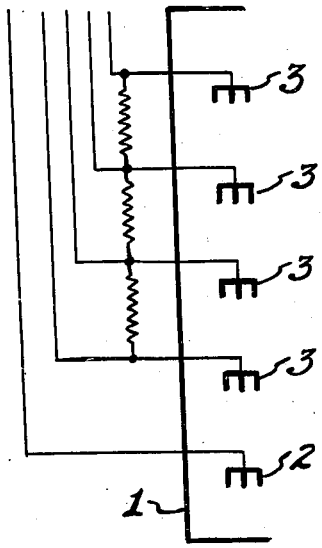
Figure 1 is a diagram indicating the identification system to which my invention applies.
Figure 2:
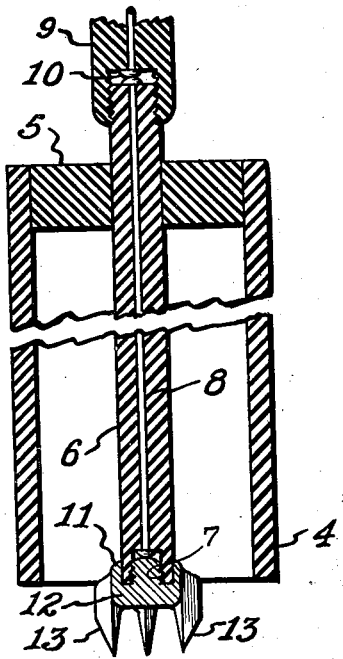
Figure 2 is a section taken through one of my new devices.
Figure 3:
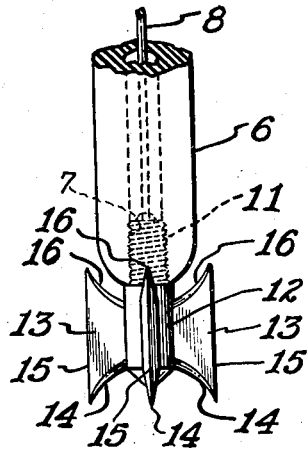
Figure 3 is a side elevation enlarged of the metal electrode itself in a modified and preferred form.

The diagram shows at 1, some of the walls of a closed compartment in the shell of a vessel. Toward the bottom thereof is an electrode 2, and interspaced through the compartment are a series of electrodes 3, 3, 3, 3. Each electrode is connected by water proof leads through the shell of the compartment, and it is apparent that from a suitable series of circuits connected to these leads, any slight current developed when sea water connects the bottom electrode with any of the upper electrodes, can be used to operate indicating or recording instruments or both.

For a disclosure of one such electric arrangement I refer to the patent to Bird et al., No. 2,229,036 dated January 21, 1941.

Referring now to the construction of the lower electrode, it is placed vertically inside the compartment, and will be connected from its upper end by water-proof protected wiring to the electrical indicating system. The sleeve 4, closed at the top by means of a plug 5, is formed preferably of such highly dielectric material as a resinous condensation product such as "Insurok," being a product of The Richardson Company of Lockland, Ohio.

Held tightly against leakage within the plug is a tube 6 of like material which has a threaded opening 7 at the lower end, and a bore which is used for the wire conductor 8. One way of forming the top of the tube, which extends through the plug is to thread it externally. To provide for connecting the cable to the top of the electrode, a fitting 9 can be threaded thereover, which fitting houses one end of the cable, and has a terminal 10 to contact the top of the conductor wire or rod that is within the tube and extends to its upper end.

The result of this structure, as already noted, is that water cannot rise in the interior of the sleeve so as to wet the entire surface of the tube or rod, which mounts the electrode.

The electrode which is threaded into the lower end of the tube or rod 6, has a threaded portion 11, and a main body 12, which consists of a barrel and projecting wings 13. These wings are tapered from the lower edge and top edge to the middle, and also tapered from the barrel to their outer edges, with the result of presenting a series of sharp edges 14 at the bottom, 15 at the sides, and 16 at the top.

Long testing in both laboratory and in vessels at sea have demonstrated that this electrode, when mounted as described will not short circuit due to sea water films, and will so cut the oil on the surface of a rising body of sea water, as to prevent the coating of any substantial portion of the exposed wings 13, with oil scum or film, thus insulating the electrode.

It will be understood that the currents developed in such an apparatus are very weak, and that only a slight insulation of an electrode will ruin the perfect working of the apparatus.

Of course similar electrodes can and should be used at the various stages throughout the compartment, although they will be made of a different metal. Thus if the electrode now described be made of cadmium, then the upper electrodes may be made of silver. Also alloys of these metals, or coatings of oxides thereof, or other metals may be used, so long as the effect is a setting up of a weak electric current in the presence of sea water or other electrolyte to be detected.

Having thus described my invention what I claim as new and desire to secure by Letters Patent is:

1. An electrode for indicating the level of an electrolyte which varies as to its level having a series of metallic wings electrically connected, said wings terminating in sharp edges some at least of which are directed substantially normally to the surface of an electrolyte, whereby oil film in a rising or falling body of sea water or other electrolyte will not insulate the electrode by filming action thereon.

2. An electrode structure for indicating the level of an electrolyte which varies as to its level comprising a sleeve of dielectric material closed at the top, and a tube of dielectric material projecting within said sleeve in interspaced relation, and having a conductor therein, and a metal electrode located at the end of the tube in electric connection with said conductor, said electrode having a series of sharp projecting edges some at least of which are directed substantially normally to the surface of an electrolyte, whereby oil film on a rising or falling body of sea water or other electrolyte will be cut and will not insulate the electrode by filming action.

3. An electrode for indicating the level of an electrolyte which varies as to its level consisting of a conductive metal formed with a series of sharp edged projections directed substantially normally to the surface of the electrolyte whereby to cut through films of oil in a rising or falling body of sea water or other electrolyte, thus preventing insulation of the electrode by filming action of the oil.

4. An electrode structure for indicating the level of an electrolyte which varies as to its level comprising a sleeve of dielectric material closed at the top, and a tube of dielectric material extending from said closed top within said sleeve in interspaced relation, and having a conductor therein, and a metal electrode located at the end of the tube in electric connection with said conductor, said electrode having a series of sharp projecting edges directed substantially normally to the plane of the level of said electrolyte, whereby oil film on a rising or falling body of sea water or other electrolyte will be cut and will not insulate the electrode by filming action, said series of sharp edges comprising a plurality of wings projecting from the body of the electrode, terminating in sharp edges.

5. An electrode for indicating the level of an electrolyte which varies as to its level having a series of substantially radial metallic wings electrically connected, said wings terminating in sharp edges on their top, bottom and outward edges.

6. An electrode for indicating the level of an electrolyte which varies as to its level having a series of metallic wings electrically connected, said wings terminating in sharp corners, and having a cross section tapering to a fine edge at both top and bottom and outer edges.

7. An electrode structure for indicating the level of an electrolyte which varies as to its level comprising a sleeve of dielectric material closed at the top, and a tube of dielectric material extending from said closed top within said sleeve in interspaced relation, and having a conductor therein, and a metal electrode located at the end of the tube in electric connection with said conductor, said electrode having a series of sharp projecting edges directed substantially normally to the plane of the level of said electrolyte, whereby oil film on a rising or falling body of sea water or other electrolyte will be cut and will not insulate the electrode by filming action, the material of the sleeve and tube being a condensation product, of high insulation value.

8. An electrode structure for indicating the level of an electrolyte which varies as to its level comprising a sleeve of dielectric material closed at the top, and a tube of dielectric material extending from said closed top within said sleeve in interspaced relation, and having a conductor therein, and a metal electrode located at the end of the tube in electric connection with said conductor, said electrode having a series of sharp projecting edges directed substantially normally to the level of said electrolyte, whereby oil film on a rising or falling body of sea water or other electrolyte will be cut and will not insulate the electrode by filming action, said series of sharp edges comprising a plurality of wings projecting from the body of the electrode, terminating in sharp corners above and below, the material of the sleeve and tube being a condensation product, of high insulation value.

GLEN W. NEELY.